United States Patent
Nishimura et al.

(10) Patent No.: US 6,795,145 B2
(45) Date of Patent: Sep. 21, 2004

(54) LIQUID CRYSTAL DISPLAY DEVICE AND ELECTRONIC APPARATUS

(75) Inventors: Joji Nishimura, Nagano-ken (JP); Tsuyoshi Maeda, Yamanashi-ken (JP); Osamu Okumura, Chino (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/244,378

(22) Filed: Sep. 17, 2002

(65) Prior Publication Data

US 2003/0076462 A1 Apr. 24, 2003

(30) Foreign Application Priority Data

Sep. 17, 2001 (JP) .......................................... 2001-282425

(51) Int. Cl.$^7$ ............................................ G02F 1/1335
(52) U.S. Cl. ....................................... 349/113; 349/115
(58) Field of Search .............................. 349/112, 113, 349/114, 115, 117, 98, 106

(56) References Cited

U.S. PATENT DOCUMENTS

| | | | |
|---|---|---|---|
| 5,729,313 A | 3/1998 | Mitsui | |
| 6,166,791 A | * 12/2000 | Mitsui et al. | 349/112 |
| 6,624,858 B2 | * 9/2003 | Nakagawa et al. | 349/84 |
| 6,636,291 B2 | * 10/2003 | Van De Witte et al. | 349/187 |

FOREIGN PATENT DOCUMENTS

| | | |
|---|---|---|
| JP | A 9-138396 | 5/1997 |
| JP | A 2000-193962 | 7/2000 |

* cited by examiner

*Primary Examiner*—Robert H. Kim
*Assistant Examiner*—David Chung
(74) *Attorney, Agent, or Firm*—Oliff & Berridge, PLC

(57) ABSTRACT

The invention provides a liquid crystal display device including switching elements and a reflection layer having low heat resistance. The liquid crystal display device is capable of reducing or preventing a degradation in the characteristics of the reflection layer due to heating in the manufacturing process. A liquid crystal display device includes a pair of opposing substrates, and a liquid crystal interposed between the substrates. A reflection layer is formed on the substrate, and switching elements (TFDs) to drive the liquid crystal are formed on the liquid crystal side of the substrate. The reflection layer is formed of any one of a dielectric reflection film, a cholesteric reflection film, and a holographic reflection film.

9 Claims, 4 Drawing Sheets

(a)

(b)

(c)

LIQUID CRYSTAL DISPLAY DEVICE AND ELECTRONIC APPARATUS

BACKGROUND OF THE INVENTION

1. Field of Invention

The present invention relates to liquid crystal display devices and electronic apparatuses. More particularly, the invention relates to a liquid crystal display device using a multi-featured reflection film having low heat resistance.

2. Description of Related Art

Reflective liquid crystal display devices consume low power because they do not utilize light sources, such as backlights, for example. Therefore, reflective liquid crystal display devices have been widely used as display sections attached to various mobile electronic devices and apparatuses. Recently, it has been proposed to use new reflection films as the reflection layers for such reflective liquid crystal display devices, and examples thereof are dielectric reflection films in which dielectric thin films having different refractive indices are alternately laminated, cholesteric reflection films using cholesteric liquid crystals, and holographic reflection films. Since these reflection films can achieve display with higher brightness and higher color purity compared to the related art reflection films formed of metal thin films, they receive attention as techniques capable of enhancing display quality of liquid crystal display devices.

SUMMARY OF THE INVENTION

However, the newly proposed reflection films have lower heat resistance compared to the related art metal reflection films formed of Al, Ag, or the like. Therefore, in particular, when the reflection films are applied to active matrix liquid crystal display devices, characteristics of the reflection layers may be changed or degraded by heating in the process of forming TFTs (Thin Film Transistors) or TFDs (Thin Film Diodes). Such degradation of the reflection layers results in a decrease in display quality and a decrease in the production yield, thus presenting an obstacle to the application of the reflection films to active matrix liquid crystal display devices.

The present invention addresses the problems described above, and provides a liquid crystal display device which includes switching elements and a reflection layer having low heat resistance, and which can reduce or prevent the characteristics of the reflection layer from degrading due to heating in the manufacturing process.

The present invention also provides an electronic apparatus including the liquid crystal display device described above.

In order to address or solve the problems described above, the present invention provides liquid crystal display devices having the construction described below.

In one aspect of the present invention, a liquid crystal display device includes a pair of opposing substrates sandwiching a liquid crystal, a reflection layer disposed on one of the substrates, and switching elements disposed on the liquid crystal side of the other substrate. The switching elements drive the liquid crystal. The reflection layer is formed of a dielectric reflection film.

In another aspect of the present invention, a liquid crystal display device includes a pair of opposing substrates sandwiching a liquid crystal, a reflection layer disposed on one of the substrates, and switching elements disposed on the liquid crystal side of the other substrate. The switching elements drive the liquid crystal. The reflection layer is formed of a cholesteric reflection film.

In another aspect of the present invention, a liquid crystal display device includes a pair of opposing substrates sandwiching a liquid crystal, a reflection layer disposed on one of the substrates, and switching elements disposed on the liquid crystal side of the other substrate. The switching elements drive the liquid crystal. The reflection layer is formed of a holographic reflection film.

In the three modes of liquid crystal display devices described above according to the present invention, the reflection layer is formed of any one of the dielectric reflection film, the cholesteric reflection film, and the holographic reflection film having lower heat resistance compared to the conventional metal reflection film on a substrate (counter substrate) other than the substrate provided with the switching elements to drive the liquid crystal. That is, since the reflection layer is not disposed on the substrate provided with the switching elements which is heated at high temperatures in the manufacturing process, the reflection layer is prevented from being overheated or overheating is reduced, and thus the characteristics of the reflection layer are prevented from being changed or degraded or the changing or degradation of these characteristics is reduced.

With respect to the manufacturing process of the switching elements, if the switching elements and the reflection layer are formed on the same substrate, in order to manufacture the switching elements without degrading the characteristics of the reflection layer, the heating temperature during the formation of the switching elements must be decreased to the heat resistance temperature or less of the reflection layer. It is very difficult to manufacture the switching elements by decreasing the heating temperature to such an extent as described above, and the yield may be decreased because of the decrease in the performance of the switching elements. However, in accordance with the construction described above, the switching elements can be formed at ordinary processing temperatures, and a decrease in the yield can be reduced or prevented with respect to the substrate provided with the switching elements.

In the liquid crystal display device of the present invention, the switching elements may be TFDs. In the liquid crystal display device of the present invention, since the reflection layer and the TFDs are formed on separate substrates, the characteristics of the reflection layer are not degraded by heating when the TFDs are formed, and the heating temperature is not restricted by the heat resistance temperature of the reflection layer. Therefore, it is possible to form the TFDs by the related art manufacturing process. Consequently, it is possible to obtain liquid crystal display devices with high brightness and high color purity without decreasing the production yield.

In this construction, the substrate provided with the TFDs is placed on the user side, and since the wiring region in the substrate for TFDs can be decreased compared to the substrate for TFTs, the aperture ratio of pixels can be increased, and thus it is possible to obtain a liquid crystal display device in which a display with higher brightness is achieved.

Alternatively, in the liquid crystal display device of the present invention, the switching elements may be TFTs. In the manufacturing process of TFTs which requires a larger number of steps, since the heating temperature in the manufacturing process is also not restricted by the heat resistance temperature of the reflection layer, it is possible to employ the related art manufacturing process, and active matrix liquid crystal display devices can be produced with high yield.

In another aspect of the present invention, an electronic apparatus includes any one of the liquid crystal display devices described above. In the electronic apparatus having the construction described above, since the liquid crystal display device which can perform a display with high brightness and high definition is provided on the display section, visibility in the display section can be significantly enhanced.

BRIEF DESCRIPTION OF THE DRAWINGS

FIG. 4(a) is a perspective view showing a mobile phone, FIG. 4(b) is a perspective view showing a mobile information processing apparatus, and FIG. 4(c) is a perspective view showing a wristwatch-type electronic apparatus.

DETAILED DESCRIPTION OF PREFERRED EMBODIMENTS

The embodiments of the present invention will be described in detail below with reference to the drawings.

Figure 1:
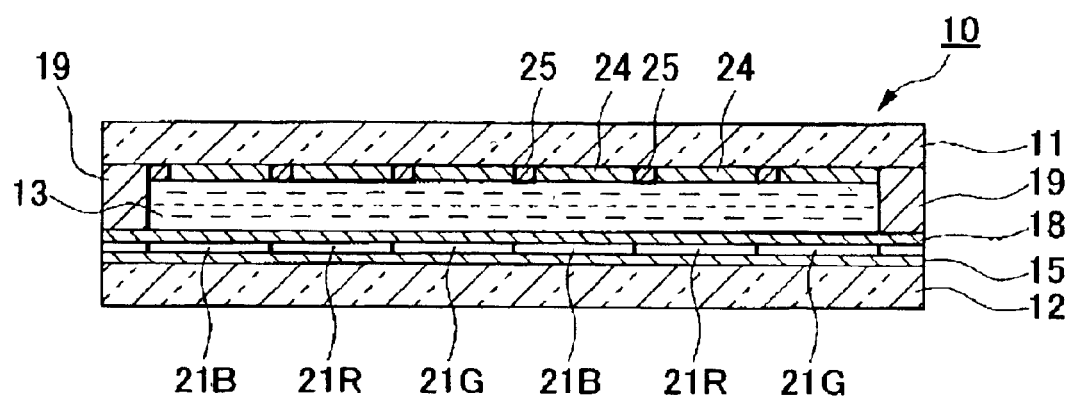
FIG. 1 is a cross-sectional view which schematically shows a liquid crystal display device in an embodiment of the present invention.
Figure 2:
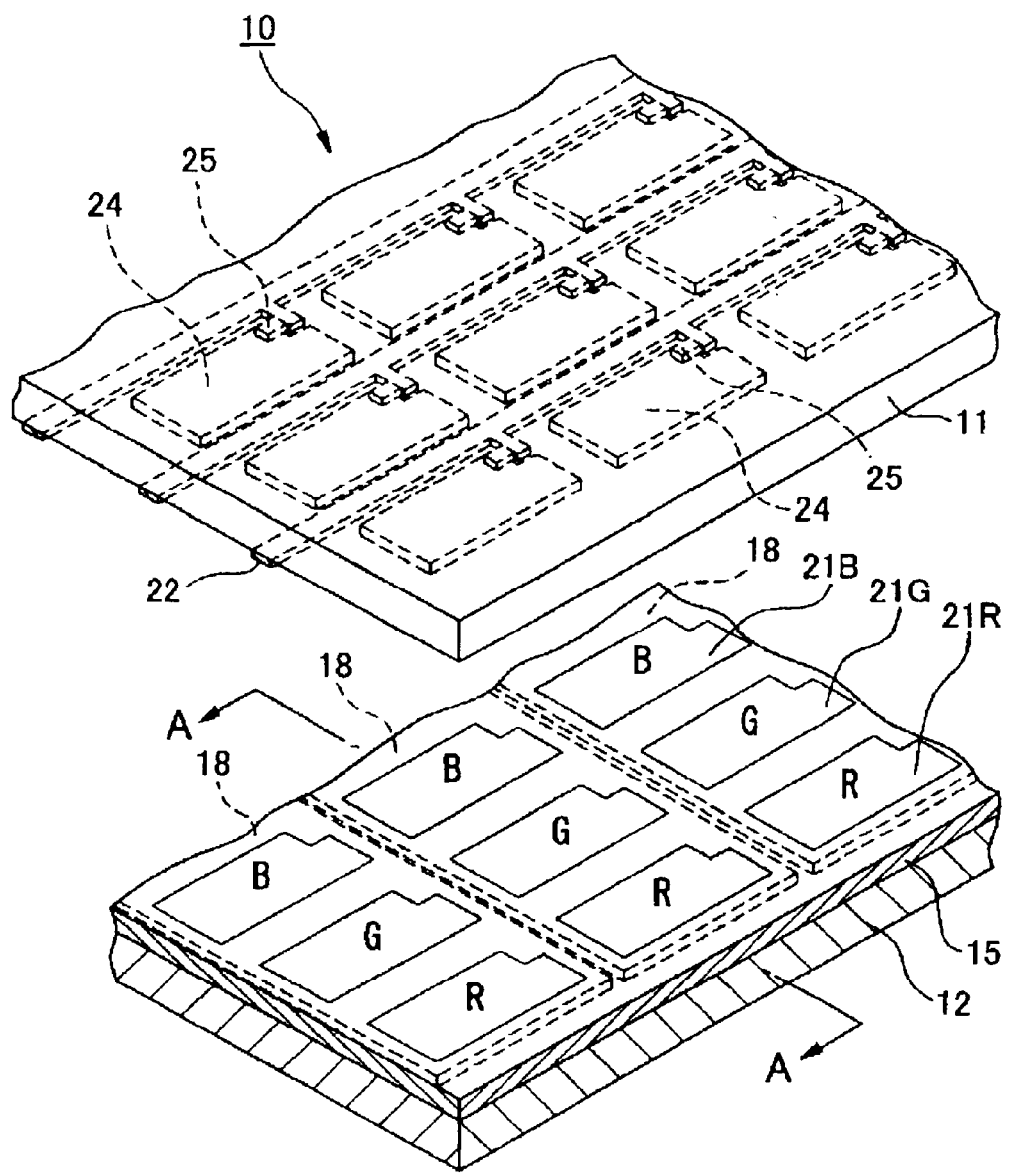
FIG. 2 is an enlarged perspective view showing a part of the liquid crystal display device shown in FIG. 1.

FIG. 1 is a schematic showing the cross-sectional structure of a liquid crystal display device in an embodiment of the present invention. FIG. 2 is an enlarged perspective view showing a part of the liquid crystal display device shown in FIG. 1. The cross-sectional view shown in FIG. 1 is taken along plane A—A of FIG. 2.

As shown in FIG. 1, a liquid crystal display device 10 includes a device substrate 11 and a reflecting substrate 12 which are opposed to each other, a liquid crystal 13 interposed between the substrates 11 and 12, and a sealant 19 provided in the peripheries of the substrates 11 and 12 in order to seal the liquid crystal 13. On the liquid crystal 13 side of the device substrate 11, TFDs 25, which are switching elements to drive the liquid crystal 13, and pixel electrodes 24 formed of transparent conductive films connected to the TFDs 25 are arrayed so that each pixel includes one TFD 25 and one pixel electrode 24. As shown in FIG. 2, many signal lines 22 extend in strips between adjacent pixel electrodes 24, and the TFDs 25 placed along one signal line 22 are electrically connected to the same signal line 22.

On the liquid crystal 13 side of the reflecting substrate 12, a reflection layer 15, color filters 21R, 21G, and 21B formed on the reflection layer 15 so as to correspond to the pixel electrodes 24 in the individual pixels, and scanning electrodes 18 formed of rectangular transparent conductive films extending in a direction intersecting with the signal lines 22 are formed. The scanning electrodes 18 cover the color filters 21R, 21G, and 21B placed in the extending direction thereof.

Additionally, although alignment layers to control the alignment of the liquid crystal 13 are disposed on the liquid crystal 13 sides of the device substrate 11 and the reflecting substrate 12, they are not shown in FIGS. 1 and 2.

The TFD 25 shown in FIG. 2 has a layered structure including two conductive films and an insulating layer interposed between the conductive films. One of the conductive films is connected to the signal line 22 and the other conductive film is connected to the pixel electrode 24. With respect to the TFD 25 having such a structure, for example, the conductive film connected to the signal line 22 may be composed of a tantalum film, the surface of the tantalum film may be anodized to form an insulating layer formed of a tantalum oxide film, and the conductive film connected to the pixel electrode 24 may be formed of a metal, such as chromium, aluminum, titanium, or molybdenum to be formed on the insulating layer.

The reflection layer 15 is provided in order to perform reflective display by reflecting light incident from the device substrate 11 side, and in the liquid crystal display device in accordance with the present invention, the reflection layer 15 is formed of any one of a dielectric reflection film, a cholesteric reflection film, and a holographic reflection film. These reflection films will be described in detail below.

(Dielectric Reflection Film)

A dielectric reflection film is a laminate in which dielectric layers having different refractive indices are alternately disposed, and has an extremely high reflectance close to 100%. In order to form the dielectric reflection film, for example, $TiO_2$ layers and $SiO_2$ layers with different thicknesses may be alternately laminated, the number of layers being approximately 10. By adjusting the lamination pitch and the number of dielectric layers to be laminated, it is possible to reflect only light with a specific wavelength, and by forming the film using a mask for each color type, it is possible to form the reflection layer 15 so as to have a color filter function. In such a case, color display can be performed without the color filters 21R, 21G, and 21B, and therefore the structure of the liquid crystal display device 10 can be simplified.

By adjusting the thickness, the dielectric reflection film can be used as a transflective film which reflects one part of the incident light and transmits the other part of the incident light. By providing an illuminating unit on the back face of the liquid crystal display device 10 (external surface of the reflecting substrate 12), a transflective liquid crystal display device can be produced. In the transflective liquid crystal display device using the dielectric reflection film, since absorption of light does not substantially occur in the dielectric reflection film, a brighter display can be obtained compared to the related art metal reflection film. The reason for this is as follows. For example, in the metal reflection film formed of Al, the reflectance is approximately 90%, and if the Al film is thinned so as to reflect 70% of the incident light and transmit the rest of the incident light, since the Al film absorbs 10% of the incident light, the resultant transflective film reflects 70% and transmits 20%. In contrast, when the transflective film using the dielectric reflection film is designed so as to reflect 70% of incident light, since the dielectric reflection film absorbs substantially no light, almost all of the remaining 30% can be used as transmitted light. Therefore, when display by reflection has the same brightness, the liquid crystal display device using the dielectric reflection film as the reflection layer can provide a brighter display by transmittance because of the higher light utilization efficiency compared to the liquid crystal display device using the Al film as the reflection layer.

(Cholesteric Reflection Film)

A cholesteric reflection film is formed of a cholesteric liquid crystal in a form of film and selectively reflects light with a specific wavelength having a specific polarization direction. By using the cholesteric reflection film, a reflection layer having high brightness and high color purity can be obtained. By appropriately controlling the helical structure of the cholesteric liquid crystal, the cholesteric reflection film may be used as a transflective layer or a reflection layer which also functions as a color filter.

Figure 3:
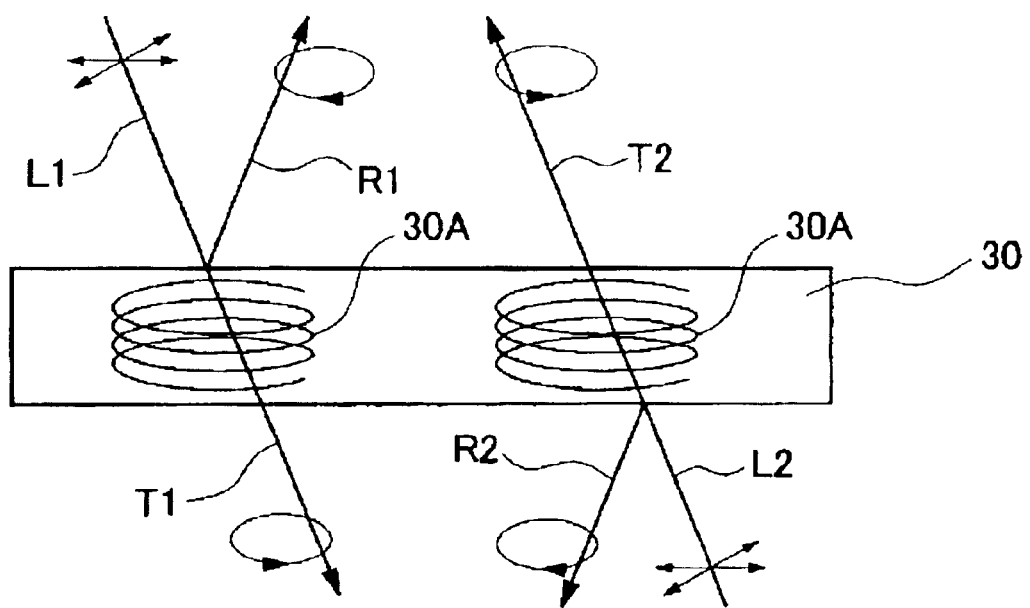
FIG. 3 is a schematic illustrating the reflection/transmission state of light in a cholesteric reflection film in accordance with the present invention.

FIG. 3 is a schematic illustrating the reflection/transmission state of light in a cholesteric reflection film. A cholesteric reflection film 30 includes a cholesteric liquid crystal 30A having a right-handed helix configuration. As shown in FIG. 3, when natural light L1 is incident on the cholesteric reflection film 30 from the upper side, since the cholesteric liquid crystal 30A has the right-handed helix configuration, the right-hand circularly polarized component is reflected upward as reflected light R1, and the left-hand circularly polarized component is transmitted downward through the reflection film 30 as transmitted light T1. When natural light L2 is incident on the cholesteric reflection film 30 from the lower side, the right-hand circularly polarized component in the natural light L2 is reflected as reflected light R2, and the left-hand circularly polarized component is transmitted upward through the reflection film 30 as transmitted light T2.

In the liquid crystal display device of the present invention, by using the characteristics of the cholesteric reflection film for the reflection layer 15, a reflective or transflective liquid crystal display device having high brightness and excellent display quality can be obtained.

Additionally, when the cholesteric reflection film 30 is applied to a transflective liquid crystal display device, the transmitted light T2 transmitted through the reflection film 30 from the lower side toward the upper side shown in FIG. 3 may be used to perform display. However, since the transmitted light T2 is left-hand circularly polarized light, the polarization state is different from that in the reflective mode in which right-handed circularly polarized light is used to perform display. Therefore, different applied voltage states of the liquid crystal must be produced between the reflective mode and the transmissive mode. In such a construction, when external light enters the reflection film 30 during display in the transmissive mode, dark pixels are brightened by the external light, and therefore the contrast is decreased. In order to avoid such a problem, a part (e.g., 20%) of light (reflected light R2) reflected from the cholesteric reflection film 30 is designed to be transmitted through the reflection film 30 so that display is performed using the transmitted light having the same polarization state as that of the reflected light R1 in the transmissive mode.

The cholesteric reflection film may also be used as a color filter. In order to achieve such a construction, the pitch of the helix of the cholesteric liquid crystal is changed so as to be substantially the same wavelength as that of the color of the reflected light. Specifically, since the pitch of the helix can be set at a given size by changing the temperature in the exposure step after coating of the cholesteric liquid crystal is performed, exposure with masking is performed so that light of a predetermined wavelength (color) is reflected for each pixel, and thus a reflection layer which has the same function as that of the color filters 21R, 21G, and 21B shown in FIG. 2 can be obtained. Additionally, when a reflection layer which also functions as a color filter is constructed with a cholesteric reflection film, the resultant color filter reflects light of a specific color in contrast to transmissive color filters in which pigments or dyes are dispersed. As a result, reflective display with higher brightness and higher color purity can be performed.

(Holographic Reflection Film)

A holographic reflection film can reflect light with a specific wavelength in a specific direction with high reflectance. For example, light incident on a liquid crystal display device at an angle of 30° can be reflected in the normal direction so that the amount of light directed toward the user of the liquid crystal display device is increased and the display brightness can be substantially enhanced. Similarly to the dielectric reflection film and the cholesteric reflection film described above, the holographic reflection film can also be used as a color filter. In such a case, the degree of interference of the reflection film is adjusted so that reflected light of corresponding colors enters the pixels of R (red), G (green), and B (blue). Moreover, since the holographic reflection film has excellent color reproducibility, it is possible to produce a liquid crystal display device having superior color reproducibility compared to the related art liquid crystal display device.

The holographic reflection film may be used as a transflective-type reflection layer by arranging light with a specific wavelength to be transmitted therethrough. Therefore, by arranging an illuminating unit on the back face of a liquid crystal display device including a reflection layer formed of such a holographic reflection film, a transflective liquid crystal display device with high brightness can be obtained.

Related art pigment-dispersed-type or dye-dispersed-type color filters may be used as the color filters 21R, 21G, and 21B. However, since any one of the reflection films used for the reflection layer 15 in the present invention can be designed so as to have the color filter function described above, the color filters are not necessarily required.

In the liquid crystal display device of the present invention having the construction described above, since the TFDs 25 to drive the liquid crystal 13 are formed on the device substrate 11 and the reflection layer 15 is formed on the reflecting substrate 12 which opposes the device substrate 11, the device substrate 11 and the reflecting substrate 12 can be heated at different temperatures in the manufacturing process. Therefore, even if a dielectric reflection film, a cholesteric reflection film, or a holographic reflection film, which has lower heat resistance compared to the related art reflection layer formed of Al or Ag, is used as the reflection layer 15, the reflection layer 15 is not overheated in the manufacturing process, and the characteristics of the reflection layer 15 are prevented from being changed or degraded or the changing or degradation of these characteristics is reduced, and therefore the reflection layer 15 can exhibit a satisfactorily high functionality.

More specifically, when the TFDs 25 are formed on the device substrate 11, the device substrate 11 is heated to at least approximately 300° C. However, since the heat resistance temperature of the dielectric reflection film is approximately 300° C., the heat resistance temperature of the cholesteric reflection film is approximately 200° C., and the heat resistance temperature of the holographic reflection film is approximately 120° C., if such a reflection film is formed on the device substrate 11, the characteristics of the reflection film are changed or degraded by heating during the fabrication process of the TFDs 25.

With respect to the device substrate 11 provided with TFDs 25, since the heating temperature at the time of forming TFDs 25 is not restricted by the heat resistance temperature of the reflection layer 15 having lower heat resistance, it is possible to form the TFDs 25, etc. by heating in the same manner as that of the related art method. Therefore, a degradation in the performance of the TFDs 25 due to insufficient heating temperatures does not occur, and a decrease in the yield associated therewith does not occur.

Since the liquid crystal display device shown in FIGS. 1 and 2 according to the present embodiment is an active matrix liquid crystal display device provided with TFDs, it is possible to increase the aperture ratio of pixels compared to the liquid crystal display device provided with TFTs, and the effect of the reflection layer provided on the reflecting substrate can be enhanced. That is, a liquid crystal display device with higher brightness can be produced.

In this embodiment, the liquid crystal display device using TFDs as switching elements is described above. However, the technical field of the present invention is not limited thereto, and the present invention is also applicable to a liquid crystal display device using TFTs as switching elements. When TFTs are used as switching elements, the heating temperature required for amorphous silicon TFTs is approximately 300° C., and the heating temperature required for high-temperature polysilicon TFTs is approximately 1,000° C. Therefore, it is extremely difficult to form the dielectric reflection film, the cholesteric reflection film, or the holographic reflection film described above on the substrate provided with the TFTs. However, in accordance with the construction of the present invention, it is possible to easily manufacture a liquid crystal display device provided with such a reflection film and the TFTs with a high yield.

(Embodiments of Electronic Apparatus)

Next, examples of electronic apparatuses including the liquid crystal display device according to the above-mentioned embodiment will be described.

Figure 4:
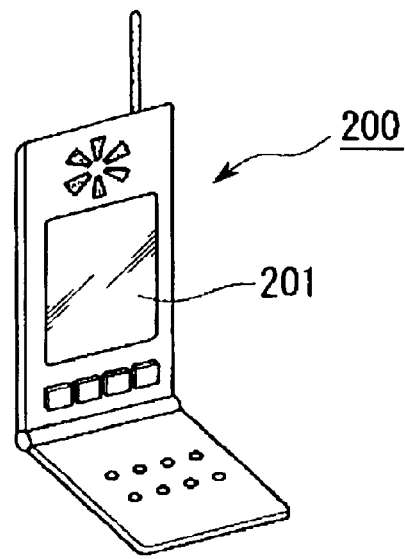
FIGS. 4(a) to 4(c) are perspective views that show examples of electronic apparatuses to which the present invention is applied, where
Figure 4:
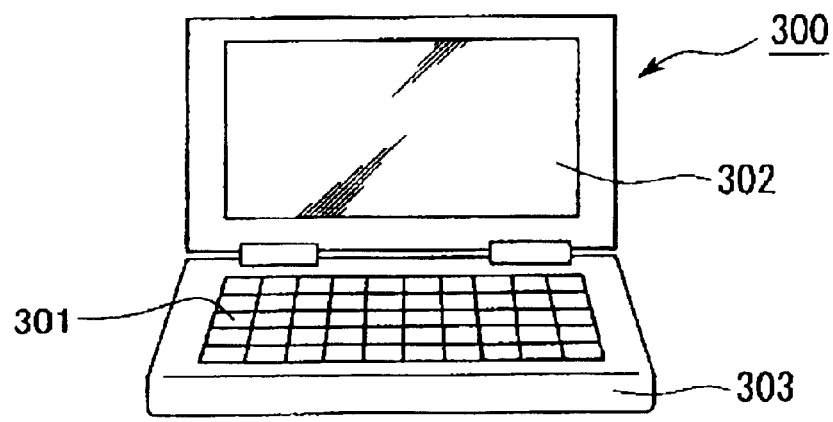
Figure 4:
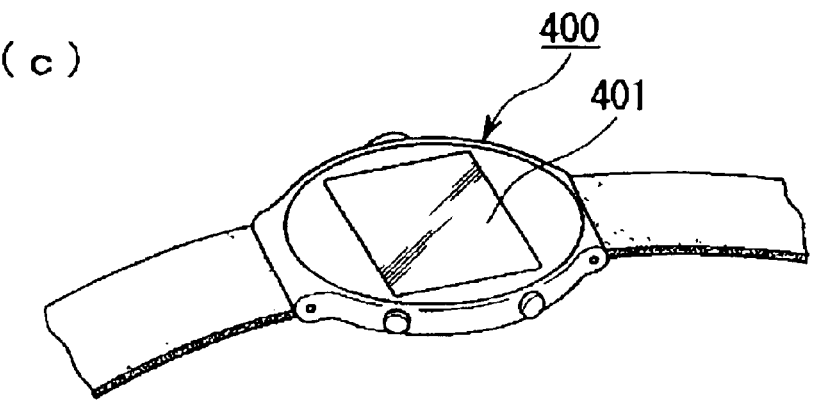

FIG. 4(a) is a perspective view showing a mobile phone. In FIG. 4(a), reference numeral 200 represents the main body of a mobile phone, and reference numeral 201 represents a liquid crystal display section using the liquid crystal display device according to the embodiment described above.

FIG. 4(b) is a perspective view showing a mobile information processing apparatus, such as a word processor or a personal computer, for example. In FIG. 4(b), reference numeral 300 represents an information processing apparatus, reference numeral 301 represents an input section, such as a keyboard, reference numeral 303 represents the main body of the information processing apparatus, and reference numeral 302 represents a liquid crystal display section using the liquid crystal display device according to the embodiment described above.

FIG. 4(c) is a perspective view showing a wristwatch-type electronic apparatus. In FIG. 4(c), reference numeral 400 represents the main body of a watch, and reference numeral 401 represents a liquid crystal display section using the liquid crystal display device according to the embodiment described above.

Since each of the electronic apparatuses shown in FIGS. 4(a) to 4(c) includes the liquid crystal display section (display unit) using the liquid crystal display device according to the embodiment described above, it is possible to perform display with high brightness and high color purity, and sharp display with excellent quality can be achieved.

[Advantages]

As described above in detail, a liquid crystal display device according to the present invention includes a pair of opposing substrates sandwiching a liquid crystal, a reflection layer disposed on the liquid crystal side of one of the substrates, and switching elements disposed on the liquid crystal side of the other substrate. The switching elements drive the liquid crystal. The reflection layer is formed of any one of a dielectric reflection film, a cholesteric reflection film, and a holographic reflection film. That is, since the reflection layer is not provided on the substrate having the switching elements which are heated at high temperatures in the manufacturing process, the reflection layer is prevented from being overheated or the overheating is reduced, and therefore a change in characteristics and degradation of the reflection layer can be reduced or avoided.

What is claimed is:

1. A liquid crystal display device, comprising:

liquid crystal;

a pair of opposing substrates sandwiching the liquid crystal;

a reflection layer disposed on one of the pair of substrates, the reflection layer being interposed between the liquid crystal and one of the pair of opposing substrates, the reflection layer including a dielectric reflection film;

color filters formed on the reflection layer and interposed between the liquid crystal and the same one of the pair of opposing substrates as the reflection layer; and switching elements disposed on another of the pair of substrates adjacent the liquid crystal, the switching elements driving the liquid crystal.

2. A liquid crystal display device, comprising:

liquid crystal;

a pair of opposing substrates sandwiching the liquid crystal;

a reflection layer disposed on one of the pair of substrates, the reflection layer being interposed between the liquid crystal and one of the pair of opposing substrates, the reflection layer including a cholesteric reflection film;

color filters formed on the reflection layer and interposed between the liquid crystal and the same one of the pair of opposing substrates as the reflection layer; and switching elements disposed on another of the pair of substrates adjacent the liquid crystal, the switching elements driving the liquid crystal.

3. A liquid crystal display device, comprising:

liquid crystal;

a pair of opposing substrates sandwiching the liquid crystal;

a reflection layer disposed on one of the pair of substrates, the reflection layer being interposed between the liquid crystal and one of the pair of opposing substrates, the reflection layer including a holographic reflection film;

color filters formed on the reflection layer and interposed between the liquid crystal and the same one of the pair of opposing substrates as the reflection layer; and switching elements disposed on another of the pair of substrates adjacent the liquid crystal, the switching elements driving the liquid crystal.

4. The liquid crystal display device according to claim 1, the switching elements being thin film diodes.

5. The liquid crystal display device according to claim 1, the switching elements being thin film transistors.

6. An electronic apparatus, comprising:

the liquid crystal display device according to claim 1.

7. A liquid crystal display device, comprising:

liquid crystal;

a pair of opposing substrates sandwiching the liquid crystal;

a reflection layer disposed on one of the pair of substrates, the reflection layer being interposed between the liquid crystal and one of the pair of opposing substrates, the reflection layer including a dielectric reflection film;

color filters interposed between the liquid crystal on one side and the reflection layer and the same one of the pair of opposing substrates as the reflection layer on the other side; and switching elements disposed on another of the pair of substrates adjacent the liquid crystal, the switching elements driving the liquid crystal.

8. A liquid crystal display device, comprising:

liquid crystal;

a pair of opposing substrates sandwiching the liquid crystal;

a reflection layer disposed on one of the pair of substrates, the reflection layer being interposed between the liquid crystal and one of the pair of opposing substrates, the reflection layer including a cholesteric reflection film;

color filters interposed between the liquid crystal on one side and the reflection layer and the same one of the pair of opposing substrates as the reflection layer on the other side; and switching elements disposed on another of the pair of substrates adjacent the liquid crystal, the switching elements driving the liquid crystal.

9. A liquid crystal display device, comprising:

liquid crystal;

a pair of opposing substrates sandwiching the liquid crystal;

a reflection layer disposed on one of the pair of substrates, the reflection layer being interposed between the liquid crystal and one of the pair of opposing substrates, the reflection layer including a holographic reflection film;

color filters interposed between the liquid crystal on one side and the reflection layer and the same one of the pair of opposing substrates as the reflection layer on the other side; and switching elements disposed on another of the pair of substrates adjacent the liquid crystal, the switching elements driving the liquid crystal.

* * * * *